(12) United States Patent
Tajiri

(10) Patent No.: US 6,876,403 B1
(45) Date of Patent: Apr. 5, 2005

(54) POLARIZED LIGHT COLOR FILTER AND VIDEO PROJECTOR COMPRISING THE SAME

(75) Inventor: Shinichiro Tajiri, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 115 days.

(21) Appl. No.: 10/089,210

(22) PCT Filed: Jun. 14, 2000

(86) PCT No.: PCT/JP00/03889

§ 371 (c)(1),
(2), (4) Date: Mar. 25, 2002

(87) PCT Pub. No.: WO01/23919

PCT Pub. Date: Apr. 5, 2001

(30) Foreign Application Priority Data

Sep. 29, 1999 (JP) .......................................... 11-277262

(51) Int. Cl.⁷ .......................................... G02F 1/1335
(52) U.S. Cl. .............................. 349/9; 349/106; 353/20; 359/250; 359/253; 359/256; 359/259
(58) Field of Search ................................ 349/106, 7–9; 353/20, 30, 31; 359/250, 253, 256, 259, 497

(56) References Cited

U.S. PATENT DOCUMENTS

| 5,221,982 | A | * | 6/1993 | Faris .......................... 349/115 |
| 5,325,218 | A | | 6/1994 | Willett et al. |
| 5,357,288 | A | | 10/1994 | Hiroshima et al. |
| 5,751,385 | A | | 5/1998 | Heinze |
| 5,815,221 | A | | 9/1998 | Kojima et al. |
| 6,130,728 | A | * | 10/2000 | Tsujikawa et al. .............. 349/9 |
| 6,404,550 | B1 | * | 6/2002 | Yajima ........................ 359/487 |

FOREIGN PATENT DOCUMENTS

| EP | 895116 | 2/1999 |
| EP | 0 909 974 | 4/1999 |
| EP | 938014 | 8/1999 |
| JP | 8-344763 | 12/1996 |
| JP | 9-138371 | 5/1997 |
| JP | 10-319347 | 12/1998 |
| JP | 11-84378 | 3/1999 |
| JP | 11-160670 | 6/1999 |

* cited by examiner

*Primary Examiner*—Robert H. Kim
*Assistant Examiner*—Michael H Caley
(74) *Attorney, Agent, or Firm*—Flynn, Thiel, Boutell, Tanis, P.C.

(57) ABSTRACT

A polarized light color filter for producing R, G and B primary lights from inputted white light in time division. The filter is small in size and strong against mechanical vibration. The projections of the R, G and B lights can be arbitrarily varied in one period. The varying speed is high, and the ratio of utilization of the quantity of light from the light source is high. Elements 36(1), 38(1), 40(1), 38(2), 40(2), 38(3), 40(3), 38(4) and 36(2) are in order stacked and bonded between glass substrates (30, 32). The elements 38(1) to 38(4) are polarized light converting elements for selecting either a mode in which the inputted light is outputted as it is by applied voltage control or a mode in which the inputted light is converted from one polarized light to the other and outputted. The elements 40(1) to 40(3) are narrow-band polarization spectroscopic elements reflecting only the S-polarized components of the R, G and B lights and transmitting the other components. The elements 36(1), 36(2) are wide-band polarization spectroscopic elements transmitting the P-polarized components over the full visible range and reflecting the P-polarized components.

22 Claims, 13 Drawing Sheets

Fig. 4

In case of the non-polarized light incident to polarized light color filter 34

| First Polarized Light Converting Element (R) | Second Polarized Light Converting Element (G) | Third Polarized Light Converting Element (B) | Third Narrow-band Polarization Spectroscopic Element | Emission Light from Filter (Transmission Side) |
|---|---|---|---|---|
| Through | Through | Through | R + G + B (P) | R + G + B (P) |
| Through | Through | Reverse | R + G (S) | R + G (P) |
| Through | Reverse | Through | R (S) | R (P) |
| Reverse | Through | Through | Absent | Absent |
| Through | Reverse | Reverse | R + B (P) | R + B (P) |
| Reverse | Reverse | Through | G + B (P) | G + B (P) |
| Reverse | Through | Reverse | B (P) | B (P) |
| Reverse | Reverse | Reverse | G (S) | G (P) |

Fig. 9

In case of the P-polarized light incident to polarized light color filter 34a

| First Polarized Light Converting Element (R) | Second Polarized Light Converting Element (G) | Third Polarized Light Converting Element (B) | Emission Light from Filter (Reflection Side) | Emission Light from Filter (Transmission Side) |
|---|---|---|---|---|
| Through | Through | Through | Absent | R + G + B (P) |
| Through | Through | Reverse | B (P) | R + G (S) |
| Through | Reverse | Through | R + G (P) | R (S) |
| Reverse | Through | Through | R + G + B (P) | Absent |
| Through | Reverse | Reverse | G (P) | R + B (P) |
| Reverse | Reverse | Through | R (P) | G + B (P) |
| Reverse | Through | Reverse | R + G (P) | B (P) |
| Reverse | Reverse | Reverse | R + B (P) | G (S) |

Fig. 10

In case of the S-polarized light incident to polarized light color filter 34a

| First Polarized Light Converting Element (R) | Second Polarized Light Converting Element (G) | Third Polarized Light Converting Element (B) | Emission Light from Filter (Reflection Side) | Emission Light from Filter |
|---|---|---|---|---|
| Through | Through | Through | R + G + B (S) | Absent |
| Through | Through | Reverse | R + G (S) | B (P) |
| Through | Reverse | Through | R (S) | G + B (P) |
| Reverse | Through | Through | Absent | R + G + B (P) |
| Through | Reverse | Reverse | R + B (S) | G (S) |
| Reverse | Reverse | Through | G + B (S) | R (S) |
| Reverse | Through | Reverse | B (S) | R + G (S) |
| Reverse | Reverse | Reverse | G (S) | R + B (P) |

Fig. 16
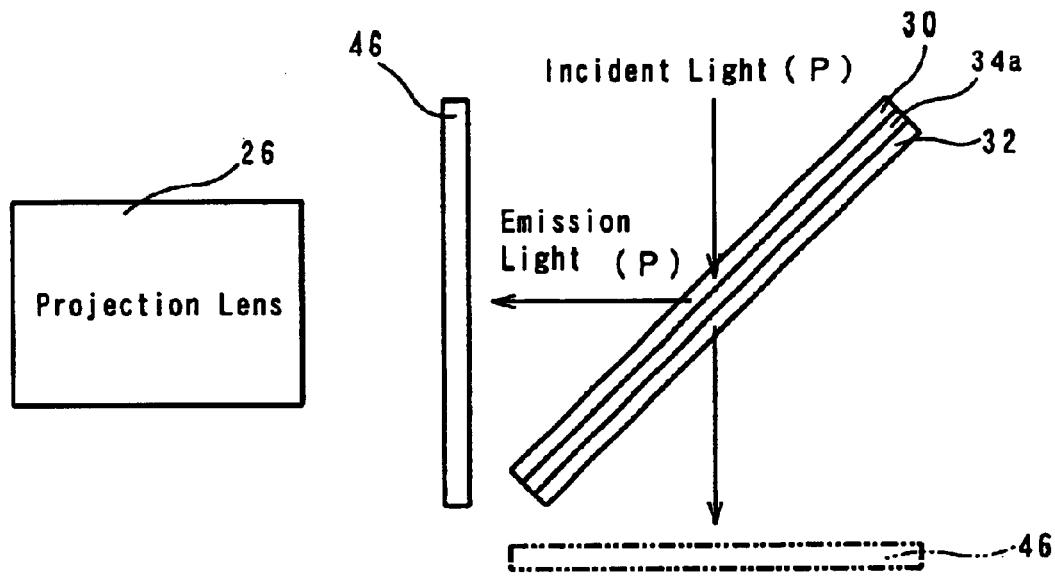
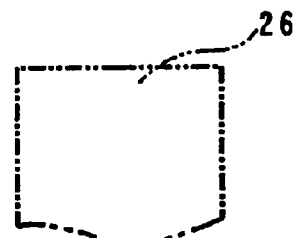
Fig. 17
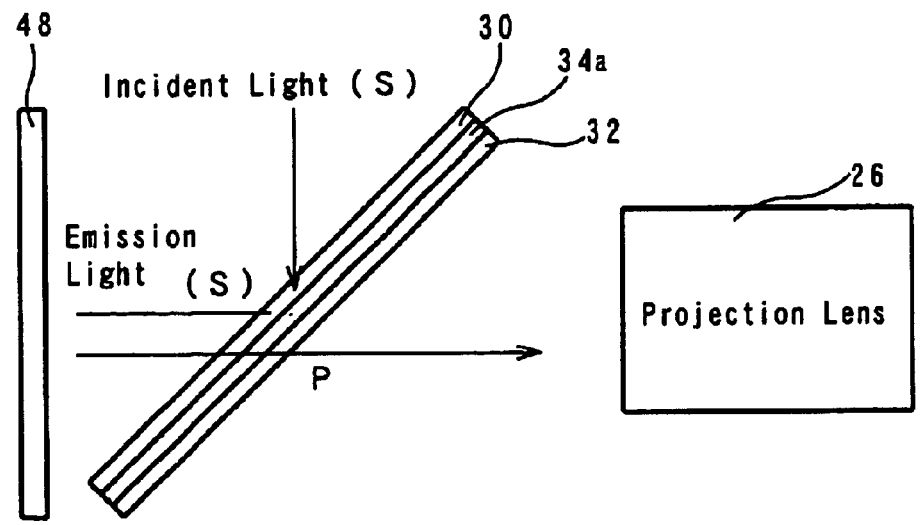

POLARIZED LIGHT COLOR FILTER AND VIDEO PROJECTOR COMPRISING THE SAME

TECHNICAL FIELD OF THE INVENTION

The present invention relates to a polarized light color filter for obtaining the three primary lights (monochromatic light), namely the R (Red) light, G (Green) light and B (Blue) light, from polarized light (P-polarized light or S-polarized light) or mixed light, as the incident light, on the time-division basis, and also relates to a video projector using such a filter.

BACKGROUND ART

Conventionally, the polarized light color filter 10 is composed as illustrated in FIG. 1, and the video projector 12 incorporating such a polarized light color filter is composed as illustrated in FIG. 2.

More particularly, the polarized light color filter 10 is composed of a rotation axis 14 and a disk-shaped filter 16, which is securely fixed to the rotation axis 14, while the disk-shaped filter 16 is composed of three substantially equally portioned filters, namely, 16r, 16g and 16b for respectively transmitting the R-, G- and B-light components. The rotation of the rotation axis 14 causes the disk-shaped filter 16 to turn in the direction of the arrow; the white light (an example of the non-polarized light) is transmitted through the back side of the disk-shaped filter 16 so that the R-, G- and B-light (monochromatic light) areobtained on the time-division basis on the opposite side of the filter through the light transmission area matching with each of the R-light component, G-light component and B-light component transmission filters 16r, 16g and 16b.

Further, in said conventional method, the video projector 12 obtains the three primary lights (R-light, G-light and B-light) on the time-division basis from the non-polarized light emitted from the white light source 20 by means of the polarized light color filter and separates the three primary lights into P-polarized light (denoted as P in the figure) and S-polarized light (denoted as S in the figure) by means of the polarized light beam splitter 22. Then, the P-polarized light is modulated by means of the front screen liquid crystal panel 24 (an example of reflection optical modulating element), and the reflected light (S-polarized light) is reflected by means of the polarized light beam splitter 22 to be projected on the screen through the projection lens 26 (not shown). In this case, when the front screen liquid crystal panel 24 is synchronized with the R-light, G-light and B-light, which are emitted from the polarized light color filter 10, the images carried by the R-light, G-light and B-light, are projected on the screen to form the colored image.

However, the conventional polarized light color filter 10 shown in FIG. 1 and the conventional video projector shown in FIG. 2 are known to have the following shortcomings.

(1) A mechanical element is necessary in order to rotate the disk-shaped filter 16, so that the mechanical vibration of the front screen liquid crystal panel 24 caused by the mechanical rotation makes the image on the screen less distinct due to the vibration transmitted to the screen. This tendency increases as the size of the filter becomes smaller. Besides, the dimensions of the filter tend to become larger relatively to the size of the actual light transmission area, thereby limiting the reduction of the size of the filter on the whole.

(2) The ratios of the R-light, G-light and B-light in a period are predetermined according to the ratios in the area of the R-light component, G-light component and B-light component transmission filter 16r, 16g and 16b, so that the ratios of the R-light, G-light and B-light cannot be varied freely during one given period.

(3) Since the switching among the R-light, G-light and B-light is made by mechanically rotating the disk-shaped filter 16, the rotating speed cannot be increased freely beyond the limit of the mechanical rotation.

(4) Since the switching among the R-light, G-light and B-light is made by mechanically rotating the diskshaped filter 16, the ratio of the light transmission area 18 for each of the filters 16r, 16g and 16bcorresponding to the R-light, G-light and B-light cannot be increased freely, thereby forcing the utilization rate per quantity of the light of the white light source 20 to be kept at a low level.

The present invention is made in consideration of the problems of the prior art as is described in the foregoing and is intended to provide a polarized light color filter, featuring substantially reduced dimensions, greater protection against the mechanical vibration, availability of free variation of the ratios among the R-light, G-light and B-light in a given period, speeding of the process for varying such ratios and the improved utilization rate per light quantity of the light source, as well as to providing a video projector incorporating such a polarized color filter.

DISCLOSURE OF THE INVENTION

The polarized light color filter according to the present invention is formed by sequentially accumulating Tha first polarized light converting element, first polarization spectroscopic element, second polarized light converting element, second polarization spectroscopic element, third polarized light converting element and third polarization spectroscopic element, of which the first polarized light converting element is provided on the incident light side; each of the first, second and third polarized light converting elements is designed for either emitting the incident light, which has been converted to P-polarized light or S-polarized light, after converting to the other polarized light from the present polarized light or transmitting the incident light as it is in response to the control of the voltage applied thereto; the first, second and third polarization spectroscopic elements are the first, second and third narrow-band polarization spectroscopic elements for reflecting only the S-polarized light components of the three primary lights while transmitting other components.

In such a construction, each of the first, second and third polarized light converting elements is controlled by the voltage applied thereto so as to selectively emit the incident light, which has been polarized to the P-polarized light or the S-polarized light, as it is or after converting the present polarized light to other polarized light. Therefore, it is possible to independently control each of the first, second and third polarization spectroscopic elements as to whether the incident light is to be outputted as the P-polarized light or the S-polarized light by controlling the voltages applied to the first, second and third polarized light converting elements. Further, the first, second and third polarization elements are the first, second and third narrow-band polarization elements designed for reflecting only the S-polarized components of the first, second and third primary lights corresponding to the three primary lights while transmitting other components. Therefore, not only can the light can be emitted as colored light (e.g., red, yellow, green, cyan, blue, magenta, white and black) produced by combining the three primary lights at will but also the ratios of the durations of various colors can be set at will. In other words, not only can the three primary lights be combined freely for producing any desired light for emission but also the ratios of the emission durations of various colored lights at will by controlling the voltages applied to the first, second and third polarized light converting elements.

In consequence, therefore, the polarized light color filter according to the present invention does not include the mechanical element as is required in the case of the prior art, and this not only enables the polarized light color filter to be built more compact, provided with higher mechanical strength, have more freedom in varying the ratios of the distribution among the R-light, G-light and B-light during a given period but also enables the switching speed to be increased, thereby contributing to the improvement in utilization rate per light quantity of the light source.

In order for the polarized light color filter to be operable when the incident light is a non-polarized light, the first wide-band polarization spectroscopic element is provided on the incident light incoming side of the first polarized light converting element so that the first wide-band polarization spectroscopic element reflects the S-polarized light component over the whole range of the visible light out of the incident light while transmitting the P-polarized light component for being emitted to the first polarized light converting element.

In order for the light emitted from the transmission side to be always the same P-polarized light even when the incident light is the non-polarized light, the first wide-band polarization spectroscopic element is provided on the incident light side of the first polarized light converting element while fourth polarized light converting element is provided on the emission side of the third polarization spectroscopic element so that the first wide-band polarization spectroscopic element reflects the S-polarized component of the incident light over the whole range of the visible lights while transmitting the P-polarized component to the first polarized light converting element, and so that the incident light, which has been converted to the S-polarized light or the P-polarized light, is selectively emitted after being converted from the present polarized light to the other polarized light or as it is by controlling the voltage applied to the fourth polarization spectroscopic element.

In order that not only the light emitted from the transmission side of the filter is always the same P-polarized lights, even when the incident light is the non-polarized lights, but also in order that the emitted light is readily applicable to the video projector incorporating the filter, the first wide-band polarization spectroscopic element is provided on the incident light side of the first polarized light converting element, while providing the fourth polarization spectroscopic element and the second wide-band polarization spectroscopic element on the emission side of the third polarization spectroscopic element so that the first wide-band polarization spectroscopic element reflects the S-polarized light component of the incident light over the whole range of the visible lights of the incident light while transmitting the P-polarized component for being inputted to the first polarized light converting element, so that the incident light, which has been converted to the P-polarized light or the S-polarized light, is selectively outputted after being converted to the other polarized light or outputted as it is by controlling the voltage applied to the fourth polarization spectroscopic element, and so that the second wide-band polarization spectroscopic element reflects the S-polarized light component of the incident light over the whole range of the visible lights while transmitting the P-polarized light component.

In order to simplify the composition of the polarized light color filter, the polarized light converting elements and the narrow-band polarization spectroscopic elements, which constitute the polarized light color filter, are accumulated on the transparent substrate, or the polarized light converting elements, narrow-band polarization spectroscopic elements and the wide-band polarization spectroscopic elements, which constitute the polarized light color filter, are accumulated on the transparent substrate.

In order to prevent the aberration from occurring on the incident plane of the polarized light color filter, the polarized light converting elements and the narrow-band polarization spectroscopic elements, which constitute the polarized light color filter, are accumulated between the inclines of two pieces of rectangular prisms which form a rectangular parallelepiped when joined, or the polarized light converting elements, narrow-band polarization spectroscopic elements and the wide-band polarization spectroscopic elements, which constitute a polarized light color filter, are provided between the inclines of the two pieces of rectangular prisms which form a rectangular parallelepiped when joined. To be more specific, the incident plane and emission plane are set orthogonal to the incident light so that the aberration occurring when these planes are not orthogonal can be prevented.

In order not only to prevent the aberration from occurring on the incident plane and the emission plane of the polarized light color filter but also to simplify the construction of the polarized light color filter, the polarized light converting elements and the narrow-band polarization spectroscopic elements, which constitute the polarized light color filter, may be provided on the incline of the rectangular prism, or the polarized light converting elements, the narrow-band polarization spectroscopic elements and the wide-band polarization spectroscopic elements, which constitute the polarized light color filter, may be provided on the incline of the rectangular prism.

The video projector according to the present invention comprises the polarized light color filter according to the present invention and is characterized in that the reflection optical modulating element is provided on the emission side of the polarized light color filter while the projection lens is provided on the non-emission side of the polarized light color filter in order for that the primary lights te be emitted to the reflection optical modulating element from the polarized light color filter eanto be controlled on the time-division basis by controlling the voltages applied to the first, second, third and fourth polarized light converting elements.

As discussed in the foregoing, by incorporating the polarized light color filter according to the present invention into a video projector comprising the reflection optical modulating element and the mechanical element, as a component common to the prior art, becomes unnecessary. As a result, the video projector according to the present invention with the reflection optical modulating element is characterized by a compactness, high strength against mechanical vibration, free and high-speed variation of the distribution ratio among the R-light, G-light and B-light during a given period and resultant improvement in the utilization per light quantity of the light source.

The video projector according to the present invention is provided with the polarized light color filter according to the present invention and is characterized in that the sequential transmission optical modulating element and the projection lens are provided on the light emission side of the polarized light color filter and the voltages applied to the first, second and third polarized light converting elements or the voltages applied to the first, second, third and fourth polarized light converting elements are controlled so as to control the three primary colors be emitted to the transmission optical modulating element from the polarized light color filter on the time-division basis.

The polarized light color filter according to the present invention is incorporated into the video projector, which is provided with a transmission optical modulating element, thereby enabling the video projector to omit the mechanical element necessary in the prior art. As a result, it has become possible for the video projector with the transmission optical modulating element to be built with greater compactness, higher mechanical strength against th mechanical vibration and to operate by freely varying the distribution ratios among the R-light, G-light and B-light at a higher speed, thereby also contributing to an improvement in the utilization rate per light quantity of the light source.

In the case of the video projector according to the present invention, which incorporates the polarized light color filter according to the present invention, in order to generally increase the brightness of the projected image, the reflection optical modulating element is provided on one of the emission sides of the polarized light color filter while providing the sequential 1/4 wave plate and the total reflection mirror on the other emission side of the polarized light color filter. That is, the brightness of the whole projected image can be increased (for higher luminance) by projecting the lights emitted from both sides of the polarized light color filter.

In the video projector according to the present invention, which incorporates the polarized light color filter according to the present invention, in order to improve the contrast of the projected image, the reflection optical modulating element is provided on one light emission side of the polarized light color filter and a second identical reflection optical modulating element is provided on the other light emission side.

In other words, the contrast of the projected image can be improved by projecting both the modulated light from the reflection optical modulating element provided on one light emission side of the polarized light color filter and the modulated light from the reflection optical modulating element provided on the other light emission side of the polarized light color filter.

BRIEF DESCRIPTION OF THE DRAWINGS

FIG. 4 is a diagram illustrating the function of the polarized light color filter 34 given in FIG. 3.

FIG. 9 is a diagram illustrating the function of the polarized light color filter given in FIG. 8 when the incident light is the P-polarized light.

FIG. 10 is a diagram illustrating the function of the polarized light color filter 34a given in FIG. 8 when the incident light is the S-polarized light.

FIG. 16 shows the video projector as the third embodiment of the present invention, which corresponds to tha basic construction of the video projector using the polarized light color filter 34a given in FIG. 8.

FIG. 17 shows the video projector as the fourth embodiment of the present invention, which corresponds to a basic construction of the video projector using the polarized light color filter 34a given in FIG. 8.

BEST MODE FOR CARRYING OUT THE INVENTION

Figure 1:
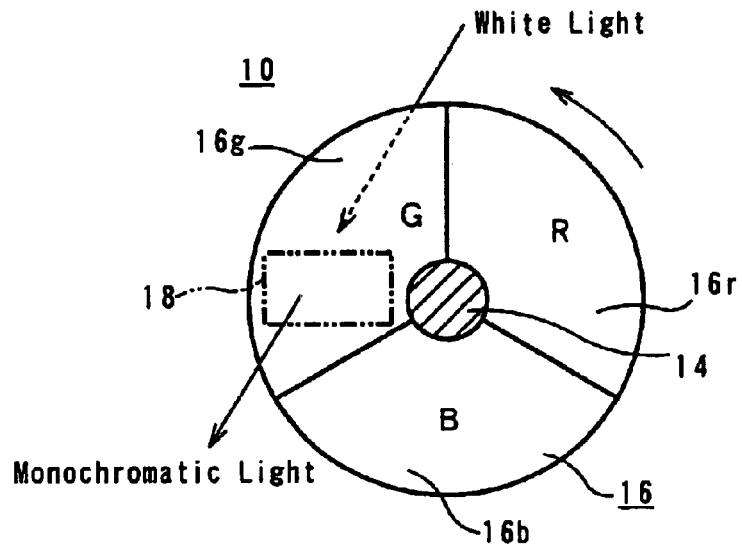
FIG. 1 is a diagram illustrating the basic construction of a conventional polarized light color filter.

The embodiments of the present invention will be described below referring to the drawings.

Figure 3:
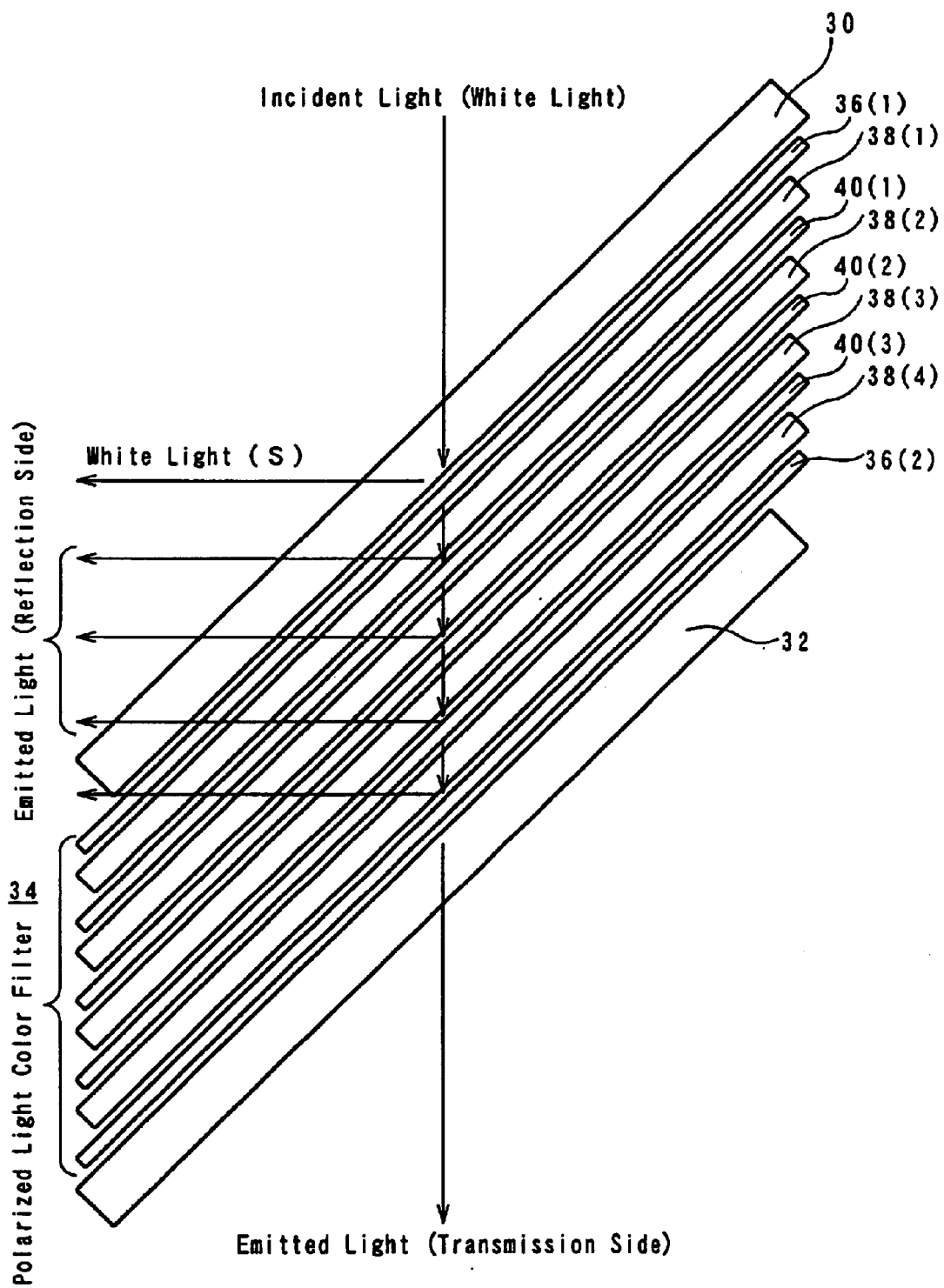
FIG. 3 is a basic exploded view of the polarized light color filter as the first embodiment of the present invention.

FIG. 3 is a basic exploded construction diagram illustrating an embodiment of the polarized color filter according to the present invention.

In FIG. 3, 30 and 32 represent transparent substrates (e.g., glass substrates) disposed at 45° to the incident light (white light). The polarized light color filter 34 is fixed between the transparent substrates 30 and 32.

Said polarized light color filter 34 comprises a first wide-band polarization spectroscopic element 36(1), a first polarized light converting element 38(1), a first narrow-band polarization spectroscopic element 40(1), a second polarized light converting element 38(2), a second narrow-band polarization spectroscopic element 40(2), a third polarized light converting element 38(3), a third narrow-band polarization spectroscopic element 40(3), a fourth polarized light converting element 38(4) and a second wide-band polarization spectroscopic element 36(2), these elements 36(1), 38(1), 40(1), 38(2), 40(2), 38(3), 40(3), 38(4) and 36(2) being provided and fixed to one another in said order between said transparent substrates 30 and 32.

Said first and second wide-band polarization spectroscopic elements 36(1) and 36(2) reflect the S-polarized component of the incident light throughout the range of the visible lights (with wavelength of 380 nm–780 nm) while transmitting the P-polarized component thereof.

Said first, second, third and fourth polarized light converting elements 38(1), 38(2), 38(3) and 38(4) are, for example, composed of liquid crystal panels respectively and function to selectively output the incident light, which has been converted to P-polarized light or S-polarized light, either after converting the present polarized light into the other polarized light or for outputting as it is, by controlling the voltage to be applied by the controller (not shown).

Said first narrow-band polarized spectroscopic element 40(1) is designed to reflect only the S-polarized component of the R-light (e.g., the red light component with a wavelength of 560 nm–780 nm) out of the visible lights (including R-, G- and B-lights) while transmitting the lights having other components (i.e., P-polarized component of R-light, and the P-polarized component and S-polarized component of B-light).

The second narrow-band polarization spectroscopic element 40(2) is designed to reflect only the S-polarized component of the G-light (e.g., the component of the green light with a wavelength of 490 nm–560 nm) while transmitting other components (i.e., P-polarized component of G-light, P-polarized components and S-polarized components of R-light and B-light).

Said third narrow-band polarization spectroscopic element 40(3) is designed to reflect only the S-polarized component of the B-light (e.g., the light of the blue component with a wavelength of 380 nm–490 nm) out of the visible lights while transmitting other components (e.g., the P-polarized component of B-light and P-polarized component and S-polarized component of the Rlight and B-light).

Next, the operation of the system shown in FIG. 3 will be described referring to FIGS. 4 and 5.

(1) For convenience of explanation, the condition in which the incident light, which has once been converted into either the P-polarized light or S-polarized light, is converted from the present polarized light to the other polarized light for emission by controlling the voltage applied to the first, second, third and fourth polarized light converting elements 38(1), 38(2), 38(3) and 38(4) is termed "reversed state" while the condition in which the incident light to be emitted without being converted is termed "through state", there will be 8 combinations from the first, second, third polarized light converting elements 38(1), 38(2) and 38(3) as given in FIG. 4.

(2) When the incident light (white light) passing through the transparent substrate 30 is incident at 45° upon the surface of the first wide-band polarization spectroscopic element 36(1), its S-polarized component is reflected by the first wide-band polarization spectroscopic element 36(1) while its P-polarized component passes through the first wide-band polarization spectroscopic element 36(1).

In other words, as shown in FIGS. 5(a) and (b), when the incident light (white light) (R+G+B), which has passed through the transparent substrate 30, falls on the first wide-band polarization spectroscopic element 36(1), the transmitted light is referred to as the P-polarized component of the white light (hereinafter referred to as [R+G+B (P)]).

(3) The [R+G+B (P)], which has passed through the first wide-band polarization spectroscopic element 36(1), is separated into the transmitted light and the reflected light by means of the first polarized light converting element 38(1), the first narrow-band polarization spectroscopic element 40(1), the second polarized light converting element 38(2), the second narrow-band polarization spectroscopic element 40(2), the third polarized light converting element 38(3) and the third narrow-band polarization spectroscopic element 40(3). In this case, the 8 combinations, as shown in FIG. 4, will be available with respect to the light emitted (transmitted) by the third narrow-band polarization spectroscopic element 40(3), depending on whether the first, second and third polarized light converting elements 38(1), 38(2) and 38(3) are in "reverse-state" or "through-state".

For instance, when the first, second and third polarized light converting elements 38(1), 38(2) and 38(3) are in the through-state, reverse-state and through-state respectively as shown in FIGS. 5(c), (e) and (g), the system operates as described in the following.

When the [R+G+B (P)], which has passed through the first wide-band polarization spectroscopic element 36(1), falls on the through-state first polarized light converting element 38(1), the transmitted light becomes [R+G+B (P)] as shown in FIG. 5(c), and when this [R+G+B (P)] falls on the first narrow-band polarization spectroscopic element 40(1) for [R (S) reflection], the transmitted light is [R+G+B (P)] as shown in FIG. 5(d).

When this [R+G+B (P)] falls on the transverse-state second polarized light converting element 38(2), the transmitted light becomes [R+G+B (S)] as shown in FIG. 5(e), and when this [R+G+B (S)] falls on the second-narrow band polarization spectroscopic element 40(2) for [G (S) reflection], the transmitted light becomes [R+B (S)] as shown in FIG. 5(f).

When this [R+B (S)] falls on the through-state third polarized light converting element 38(3), the transmitted light becomes [R+B (S)] as shown in FIG. 5(g), whereas when this [R+B (S)] falls on the third narrow-band polarization spectroscopic element 40(3) for [B (S) reflection], the transmitted light becomes [R (S)] as shown in FIG. 5(h). This [R (S)] is the emitted light (transmitted light) from the third narrow-band polarization spectroscopic element shown in FIG. 4.

When the [R (S)], emitted from the third narrow-band polarization spectroscopic element 40(3) falls on the reversed-state fourth polarized light converting element 38(4), the transmitted light becomes [R (P)] as shown in FIG. 5(i), and when this [R (P)] falls on the second wide-band polarization spectroscopic element 36(2) for [(S) reflection], the transmitted light becomes [R (P)] as shown in FIG. 5(j); this transmitted light passes through the transparent substrate 32 to become the emitted light as shown in FIG. 5(k). This emitted light will become the light to be emitted from (transmitted by) the filter shown in FIG. 4.

As discussed in the foregoing, [R+G+B (S)], [R+B (S)], [R (S)], [R (P)] respectively represent the S-polarized light component of the white light, the S-polarized light component of the mixture of R-light and B-light (Magenta), the S-polarized component of the red light and the P-polarized component of the red light.

Similar effects can also be obtained where the first, second and third polarized light converting elements 38(1), 38(2) and 38(3) are respectively in the states other than the through-state, reverse-state and through-state.

For instance, when the first, second and third polarized light converting elements 38(1), 38(2) and 38(3) are respectively in the through-state, through-state and through-state, the light emitted (transmitted) by the third wide-band polarization spectroscopic element 40(3) becomes [R+G+(P)]; when the emitted light is in the through-state, through-state and through-state respectively, the emitted light becomes [R+G+(S)]; when the emitted light is in the reverse-state, through-state and through-state, the emitted light becomes [absent] (absence of transmitted light). Here, the [R+G (S)] represents the S-polarized light component of the mixture of the R-light and the G-light (representing yellow color).

(4) As described in the above Section (3), the fourth polarized light converting element 38(4) is designed to make all the lights emitted (transmitted) from the polarized light color filter 34 have the P-polarized light component, so that the emitted light (transmitted light) from the third narrow-band polarization spectroscopic element 40(3) being the S-polarized light is converted into the P-polarized light for output, by controlling the voltage applied to thereto. For instance, when the timings of the voltages to be applied to the first, second and third polarized light converting elements 38(1), 38(2) and 38(3) are set for the through-state, through-state and reverse-state respectively, the applied voltage is controlled so that the fourth polarized light converting element 38(4) is set to the reversed-state, whereby the [R+G (S)] is converted to [R+G (P)].

When the timings of the voltages to be applied to the first, second and third polarized light converting elements 38(1), 38(2) and 38(3) are set to the through-state, reverse-state and reverse-state, the applied voltages are controlled so that the fourth polarized light converting element 38(4) is set to the through-state, thereby enabling the [R+B (P)] to be emitted as it is.

Further, the second wide-band polarization spectroscopic element 36(2) is designed so that the polarized light color filter 34 can be utilized for the video projector, and, for this purpose, the reflection optical modulating element (e.g., front screen liquid crystal display panel) is provided on the light emission (transmission) side so that the reflected light (S-polarized light), which has been modulated by the reflection optical modulating element, is reflected to be supplied to the projection lens.

(5) Therefore, by inputting the white light from the light source while controlling the voltages applied to the first, second, third and fourth polarized light converting elements 38(1), 38(2), 38(3) and 38(4) on the time-division basis, the lights of 8 different colors to be emitted (to be transmitted), at a maximum, (white, yellow, red, black, magenta, cyan, blue and green), ranging from [R+G+B (P)] to [G (P)], can be made available on the time-division basis.

In this case, since the colors of the lights to be emitted can be selected by the electrical control means, the dimensions of the system can be reduced compared with the conventional system which uses the mechanical control means, whereby the system according to the present invention has the advantages such as the greater strength against mechanical vibration, freedom of varying and varying at higher speeds the distribution of R-light, G-light and B-light during a given period, thereby improving the utilization rate per light quantity of the light source.

Figure 6:
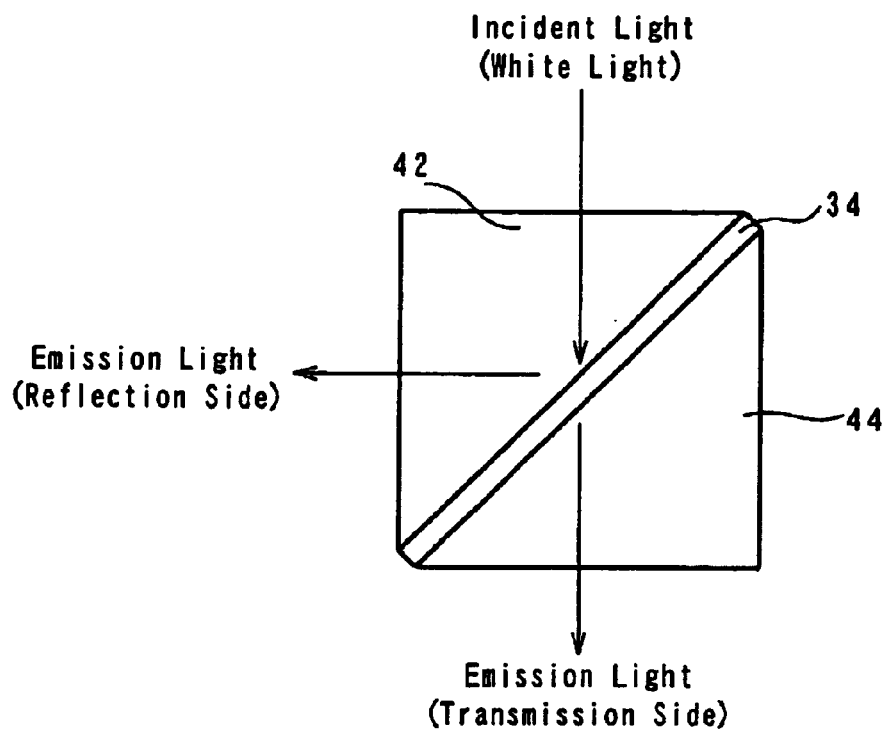
FIG. 6 is a diagram illustrating the basic construction of an embodiment of the present invention, wherein the rectangular prisms 42 and 44 are used instead of the transparent substrates 30 and 33.
Figure 7:
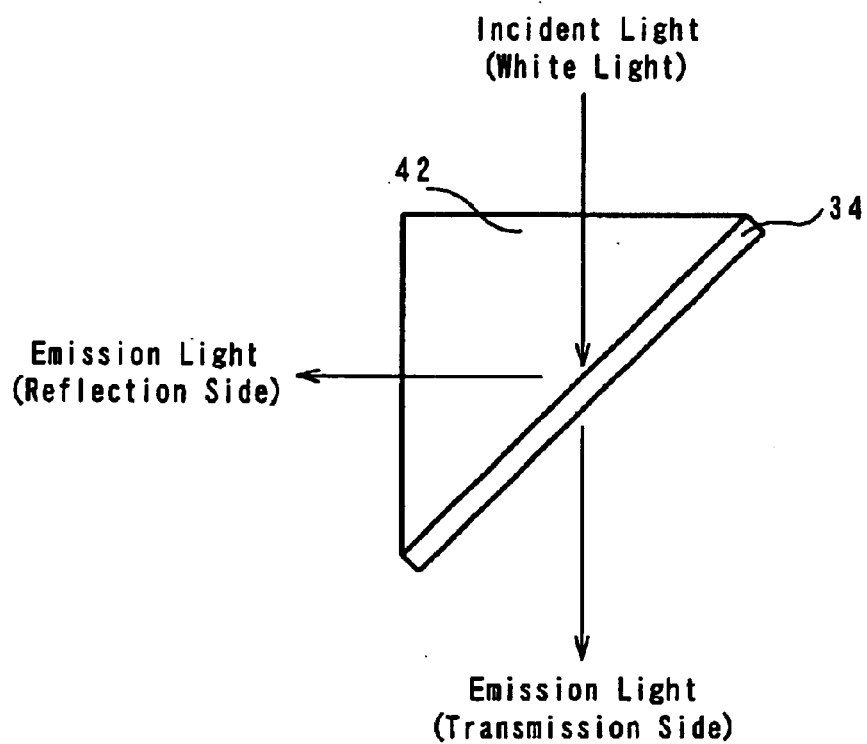
FIG. 7 is a diagram of a basic construction illustrating the embodiment wherein the rectangular prism 44, out of the rectangular prisms 42 and 44 given in FIG. 6, is omitted.

What is described above is concerned with an embodiment wherein the polarized light color filter is securely interposed between the transparent substrates, but the present invention is not limited to this embodiment and is also applicable to the case where the polarized light color filter 34 is securely interposed between 2 pieces of triangular prisms 42 and 44 which form a rectangular parallelepiped when joined by their inclined surfaces as shown in FIG. 6, as well as to the case where a polarized color filter 34 is fixed securely to the inclined surface of a triangular prism 42 as shown in FIG. 7.

In the case shown in FIG. 6, the angle of the incident light (white light) is orthogonal to the triangular prism 42 and also the angle of emission is also orthogonal to the triangular prisms 42 and 44 and so the aberration caused by the refraction and distortion of the light occurring at incident plane in the case where the transparent substrates 30 and 32 are used can be prevented.

Further, in the case shown in FIG. 7, the angle of incidence of the light (white light) to the triangular prism 42 is orthogonal while the angle of emission (reflection) of the light is also orthogonal to the triangular prism 42, and so not only the occurrence of the aberration can be prevented but also the other triangular prism 44 can be omitted.

What has been described in the foregoing is concerned with the embodiment wherein the polarized light color filter comprises the fourth polarized light converting element 38(4), for making uniform all the emitted lights (transmitted lights) for becoming the P-polarized light, and the second wide-band polarization spectroscopic element 36(2), but the present invention is not limited to this embodiment and is applicable to the case where the fourth polarized light converting element 38(4) and the second wide-band polarization spectroscopic element 36(2) are omitted and to the case where the second wide-band polarization spectroscopic element 36(2) is omitted.

For instance, when all the emitted (transmitted) lights (8 spectral lights) are to be outputted without being converted to the P-polarized lights on the time-division basis or used only for a video projector incorporating the reflection optical modulating element, either both the fourth polarized light converting element 38(4) and the second wide-band polarization spectroscopic element 36(2) or the second wide-band polarization spectroscopic element 36(2) alone can be omitted.

Figure 8:
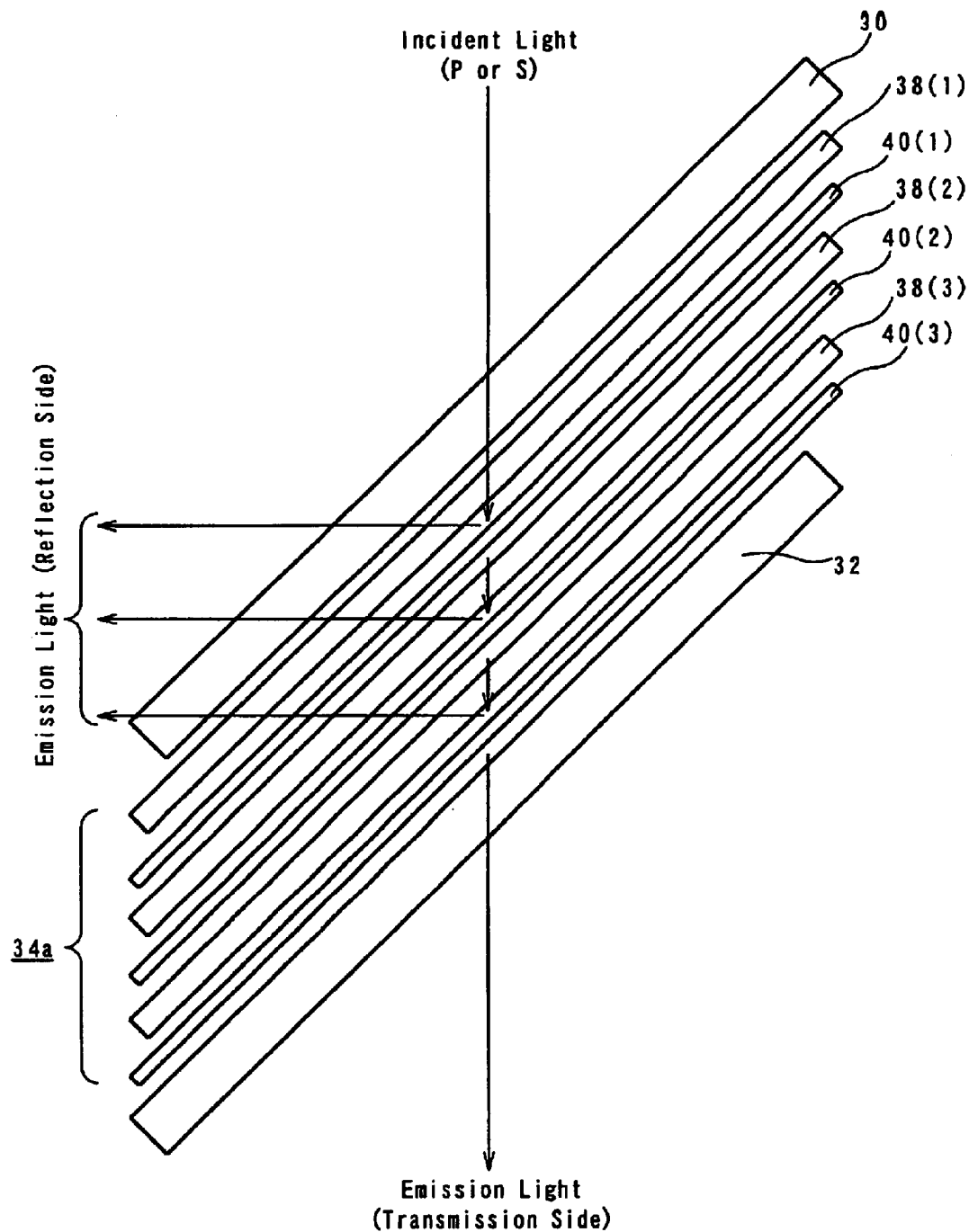
FIG. 8 is a diagram of a basic construction illustrating the polarized light color filter as the second embodiment of the present invention.

The above description is concerned with the embodiment, wherein the polarized light color filter is used when the incident light is a non-polarized light (white light), but the present invention is not limited to this embodiment and is also applicable, for example, to ha polarized color filter 34a which is used when the incident light is the P-polarized light or S-polarized light as shown in FIG. 8.

FIG. 8 is an exploded view of the basic eempealteti construction, wherein those components common to those shown in FIG. 3 are represented by the common numeral references. As shown in FIG. 8 the polarized light color filter 34a is securely interposed between the transparent substrates 30 and 32.

Said polarized light color filter 34a comprises the first polarized light converting element 38(1), the first narrow-band polarization spectroscopic element 40(1), the second polarized light converting element 38(2), the second narrow-band polarization spectroscopic element 40(2) and the third narrow-band polarization spectroscopic element 40(3), all these elements being accumulated in order from the side of the transparent substrate 30 towards thetransparent substrate 32 and fixed securely to one another and to said transparent substrates.

Next, the operation of the system shown in FIG. 8 will be described separately as to the case (A) where the incident light is the P-polarized light and the case (B) where the incident light is the S-polarized light.

In both of these cases, the first, second and third polarized light converting elements 38(1), 38(2) and 38(3) are set to either the reverse-state, in which the incident light (P-polarized light or S-polarized light) is reversed for output, or set to the through-state, in which the incident light (P-polarized light or S-polarized light) is outputted as it is, by controlling the voltage applied thereto, and so 8 different states will be available by combining the states available with respect to the first, second and third polarized converting elements 38(1), 38(2) and 38(3) as shown in FIG. 9 and FIG. 10.

(A) Case where the Incident Light is P-polarized Light:

(1) The P-polarized light, which has passed through the transparent substrate 30, is separated into the component to be transmitted and the component to be reflected by means of the first polarized light converting element 38(1), the first narrow-band polarization spectroscopic element 40(1), the second polarized light converting element 38(2), the second narrow-band spectroscopic element 40(2), the third polarized light converting element 38(3) and the third narrow-band polarization spectroscopic element 40(3). In this case, the light to be reflected and the light to be transmitted by the third narrow-band polarization spectroscopic element 40(3) will be available in 8 kinds as shown in FIG. 9, depending on whether the states of the first, second and third polarized light converting elements 38(1), 38(2) and 38(3) are in the reverse-state or in the through-state respectively.

For instance, the light to be emitted on the reflection side will be [absent] (absence of reflected light) when the first, second and third polarized light converting elements 38(1), 38(2) and 38(3) are in the through-state, through-state and through-state respectively; the emission will be [B (p)] (blue light) when the same are in the through-state, through-state and reverse-state respectively; the emitted light will be [G+B (P)] (cyan color light) when the same are in the through-state, reverse-state and through-state respectively; the emission will be [R+G+B (P)] (white light) when the same are in the reverse-state, throughstate and through-state respectively.

Further, the transmitted lights shown in FIG. 9 are equivalent to the lights transmitted by the third narrowband polarization spectroscopic element 40(3).

(2) Therefore, when the P-polarized light is the incident light, the emissions for up to 8 different colors (black, blue, cyan, white, green, red, yellow and magenta), ranging from [absence] to (R+B (P)), can be made available on the time-division basis by controlling the voltages applied to the first, second and third polarized light converting elements 38(1), 38(2) and 38(3) on the time-division basis. In this case, all the lights of 8 different colors can be made uniform in terms of the direction of polarization (to P-polarized light).

Further, as shown in FIG. 9, the lights of 8 different colors (white, yellow, red, black, magenta, cyan, blue and green), ranging from [R+G+B (P)] to [G(S)] can be emitted (transmitted) on the transmission side on the time-division basis.

(B) Case where Incident Light is S-polarized Light:

(1) The S-polarized light transmitted through the transparent substrate 30 is separated into the component to be reflected and the component to be transmitted by means of the first polarized light converting element 38(1), the first narrow-band polarization spectroscopic element 40(1), the second polarized light converting element 38(2), the second narrow-band polarization spectroscopic element 40(2), the third polarized light converting element 38(3) and the third narrow-band polarization spectroscopic element 40(3). In this case, as shown in FIG. 10, 8 different lights will be emitted on the reflection side and the transmission side of the third narrow-band polarization spectroscopic element 40(3) depending on whether the first, second and third polarized light converting elements 38(1), 38(2) and 38(3) are in the reverse-state or the through-state respectively.

For instance, the reflected lights will be [R+G+B (S)] (white light) when the first, second and third polarized light converting elements 38(1), 38(2) and 38(3) are in the though-state, through-state and throughstate respectively; the same will be [R+G (S)] (yellow color) when the same elements are in the through-state, through-state and reverse-state respectively; the same will be [R (S)] (red color) when 4ethe same elements are in the through-state, reverse-state and through-state respectively; the same will be [absence] (no reflected light) when the same elements are in the reverse-state, through-state and through-state respectively.

On the other hand, the lights emitted on the transmission side will be [absent] (no transmitted light) when the first, second and third polarized light converting elements 38(l), 38(2) and 38(3) are in the through-state, through-state and through-state respectively; the same will be [B (P)] (blue light) when the same are in the through-state, through-state and reverse-state; the same will be [G+B (P)] (cyan color) when the same are in the through-state, reverse-state and through-state.

(2) Therefore, when the S-polarized light is inputted and when the voltage applied to the first, second and third polarized light converting elements 38(1), 38(2) and 38(3) are controlled on the time-division basis, the lights of up to 8 different colors (white, yellow, red, black, magenta, cyan, blue and green), ranging from [R+G+B (S)] to [G (S)], can be emitted on the time-division basis. In this case, all the lights of 8 different colors can be made uniform in terms of the direction of the polarization (to S-polarized light).

On the other hand, as shown in FIG. 10, the transmitted lights of 8 different colors (black, blue, cyan, white, green, red, yellow and magenta), ranging from [absence] to [R+B (P)], can be emitted on the time-division basis.

Figure 11:
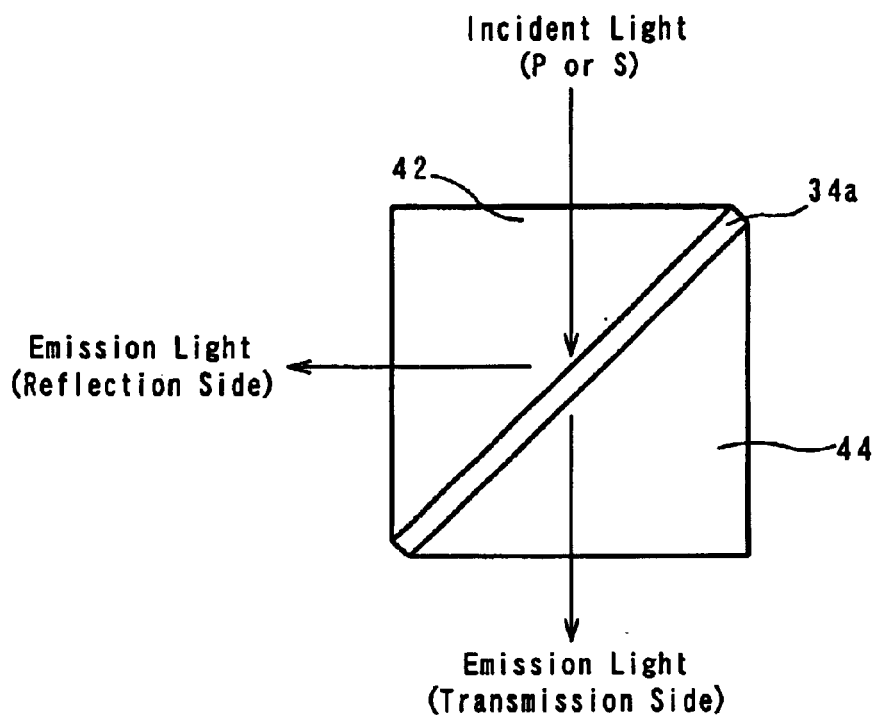
FIG. 11 is a diagram of a basic construction illustrating the embodiment wherein rectangular prisms 42 and 44 are used instead of transparent substrates 30 and 32 of FIG. 8.
Figure 12:
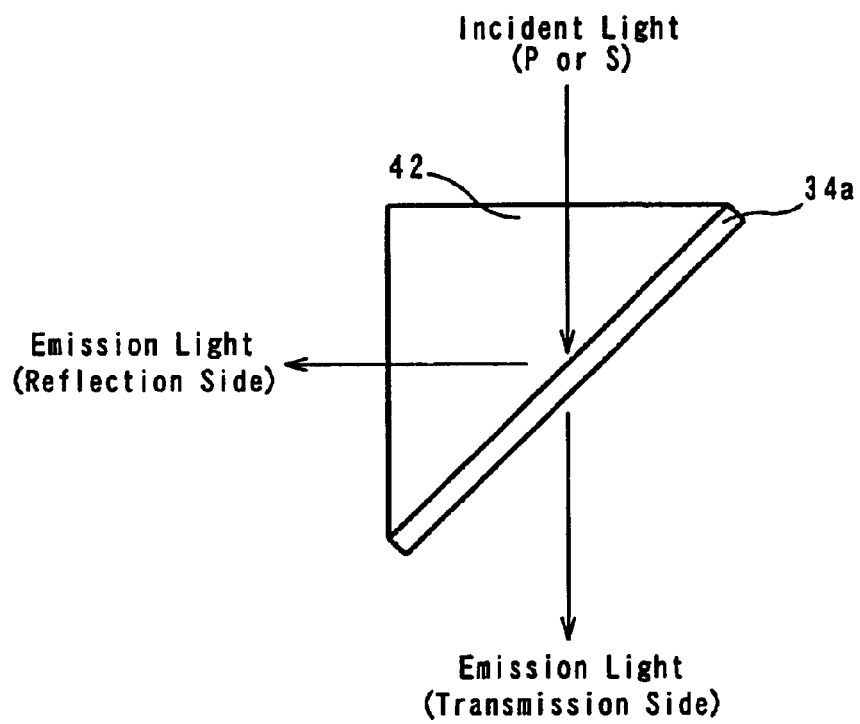
FIG. 12 is a diagram of a basic construction illustrating the embodiment wherein rectangular prism 44, out the rectangular prisms 43 and 44 given in FIG. 11, is omitted.

What has been described above is concerned with the embodiment shown in FIG. 8, wherein the polarized light color filter is securely interposed between the transparent substrates, but the present invention is not limited to this embodiment and is also applicable to the embodiment wherein the polarized light color filter 34a is securely interposed between the inclines of the 2 pieces of the triangular prisms 42 and 44, which constitutes a rectangular parallelepiped as s shown in FIG. 11 and also to the embodiment wherein the polarized light color filter 34a is fixed securely to the incline of the triangalur prism 42 as shown in FIG. 12. The polarized light color filter 34a is formed by accumulating the first polarized light converting element 38(1), the first narrow-band polarization spectroscopic element 40(1), the second polarized light converting element 38(2), the second narrow-band polarization spectroscopic element 40(2) and the third polarized light converting element 38(3) and the third narrow-band polarization spectroscopic element 40(3) to be interposed between the inclined surfaces of the triangular prisms 42 and 44 in the case of the embodiment shown in FIG. 11, while the same is fixed securely to the inclined surface of the triangular prism 42 in the case of the embodiment shown in FIG. 12.

In the case of the embodiment having the composition shown in FIG. 11, the angle of incidence of the incident light (white light) is orthogonal to the triangular prism 42 and angles of incident light to the triangular prisms 42 and 44 are also orthogonal respectively, so that the occurrence of the aberration can be prevented.

In the case of the embodiment having the construction shown in FIG. 12, the angle of the incidence of the incident light to the triangular prism 42 is orthogonal, so that not only the occurrence of the aberration can be prevented but also the other triangular prism 44 can be omitted.

Figure 2:
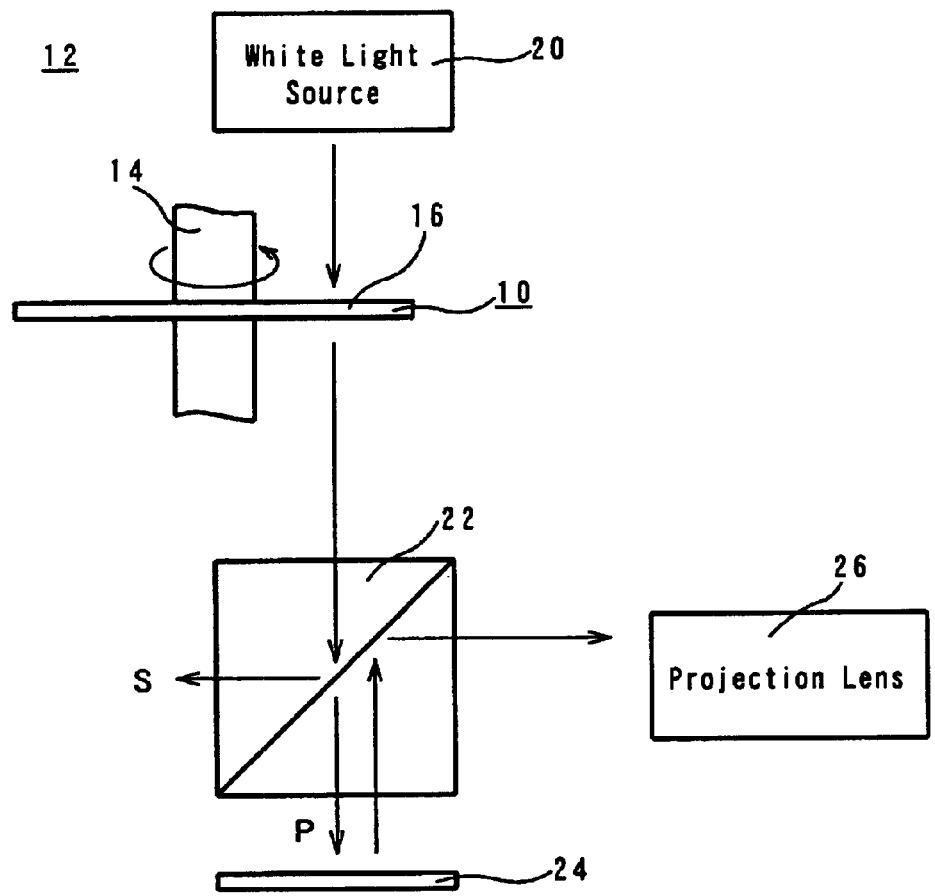
FIG. 2 is a diagram illustrating the basic construction of a video projector incorporating the polarized light color filter given in FIG. 1.
Figure 13:
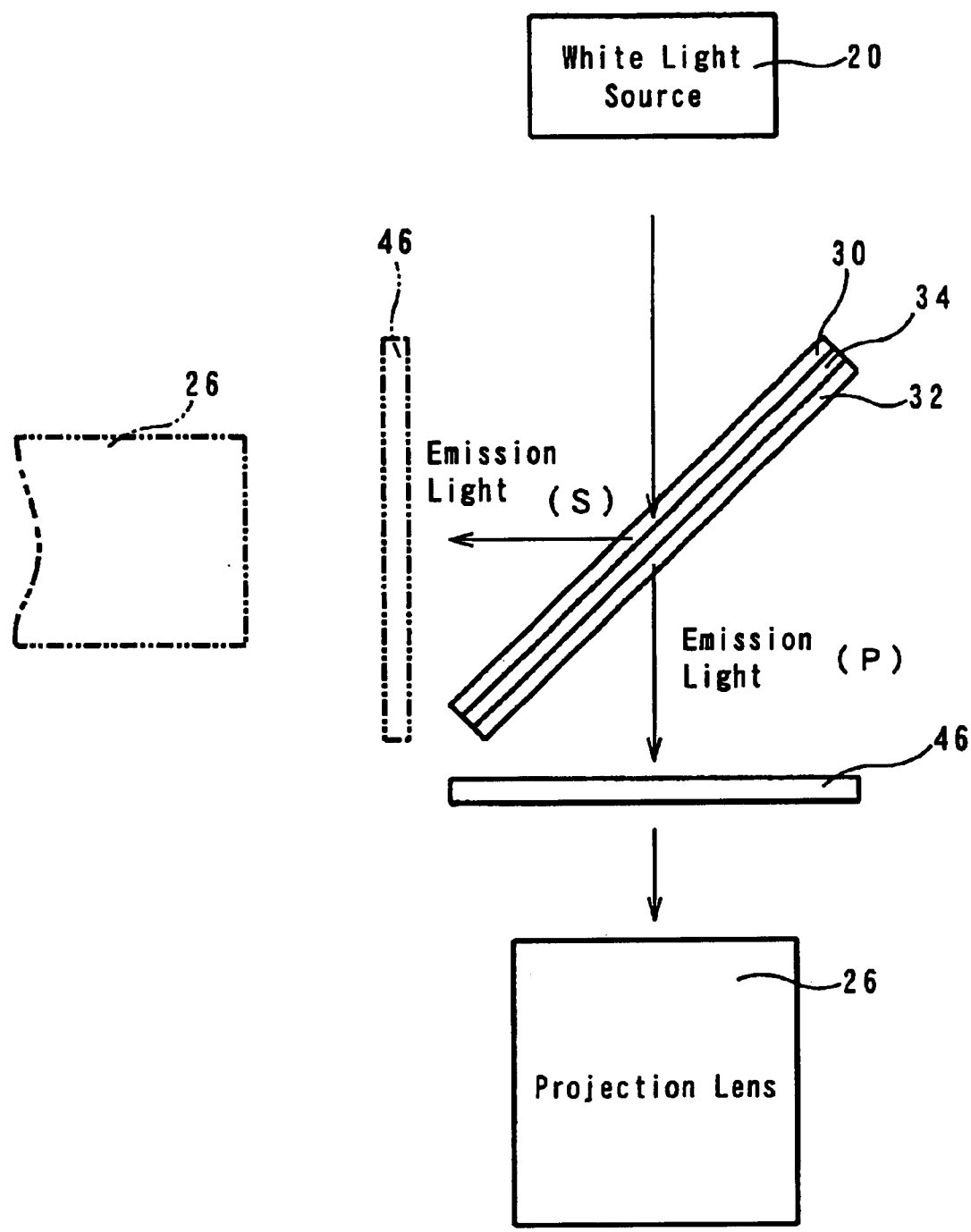
FIG. 13 is a diagram illustrating the video projector as the first embodiment of the present invention, which corresponds to a basic construction of the video projector incorporating the polarized light color filter 34 given in FIG. 3.

FIG. 13 is a diagram showing a basic construction of the video projector incorporating the polarized light color filter according to the present invention; in this diagram, those components common to those shown in FIG. 2 and FIG. 3 are represented by the common reference numerals.

In FIG. 13, reference numeral 20 represents the white light source for emitting the white light; 26, the projection lens; 30 and 32, the transparent substrates; 34, the polarized light color filter securely interposed between the transparent substrates 30 and 32; 46, the rear projection liquid crystal panel (an example of the transmission optical modulating element).

The white light source 20, the transparent substrates 30 and 32 and the polarized light color filter 34 are arranged so that the white light emitted from the white light source 20 falls at about 45° on the surface of the transparent substrate 30, while the transmission liquid crystal liquid panel 46 and the projection lens 26 are arranged so that the incident angle of the light emitted (on the transmission side) from the polarized light color filter 34 is almost orthogonal.

Next, the operation of the video projector shown in FIG. 13 will be described in the following.

(1) When the white light outputted from the white light source 20 falls on the polarized light color filter 34 and when the voltages applied to the first, second, third and fourth polarized light converting elements 38(1), 38(2), 38(3) and 38(4), which constitutes the polarized light color filter 34, are controlled with predetermined timings, the polarized color filter 34 selectively and sequentially outputs R-light, G-light and B-light.

For instance, by sequentially switching the states of the first, second, third and fourth polarized light converting elements 38(1), 38(2), 38(3) and 38(4) from (through-state, reverse-state, through-state, reverse-state), [reverse-state, reverse-state, reverse-state, reverse-state] to [reverse-state, through-state, reverse-state, through-state) for each period (T/3), equivalent to one third of one period (T), R-light, G-light and B-light can be emitted selectively and sequentially.

(2) The R-light, G-light and B-light, emitted from the transmission side of the polarized light color filter 34, is modulated by the transmission liquid crystal panel 46 to be projected on the screen (not shown) through the projection lens 26. In this case, the transmission liquid crystal panel 46 is synchronized with the R-light, G-light and B-light, outputted from the polarized light color filter 34, to display the images of the R-light, G-light and B-light, which forms an enlarged color image on a screen.

The embodiment shown in FIG. 13 has the rear projection liquid crystal panel 46 provided on the transmission side of the polarized light color filter 34, but the present invention is not limited to this embodiment and is also applicable to the case where the rear projection liquid crystal panel 46 is provided on the reflection side, that is, on the opposite side of the transmission side, as indicated by the alternate-long-and-two-short dash-line.

In this case, the emitted lights (on reflection side) up to the stage of third narrow-band polarization spectroscopic element 40(3) of the polarized light color filter 34 are similar to the emitted lights (reflection side) from the filter shown in FIG. 9, so that, by selectively switching the states of the first, second, third and fourth polarized light converting elements 38(1), 38(2), 38(3) and 38(4) from [reverse-state, reverse-state, through-state, through-state], [through-state, reverse-state, reverse-state, through-state] to (through-state, through-state, reverse-state, reverse-state] for each period (T/3), R-light, G-light and B-light are selectively and sequentially emitted. In this case, the state of the fourth polarized light converting element 38(4) is controlled to vary in the order of [through-state], [through-state] and [reverse-state] for every period (T/3) so that the light transmitted by the third narrow-band polarization spectroscopic element 40(3) can be prevented from being emitted to the rear projection liquid crystal panel 46 and the projection lens 26, by being reflected by the second wide-band polarization spectroscopic element 36(2).

Figure 14:
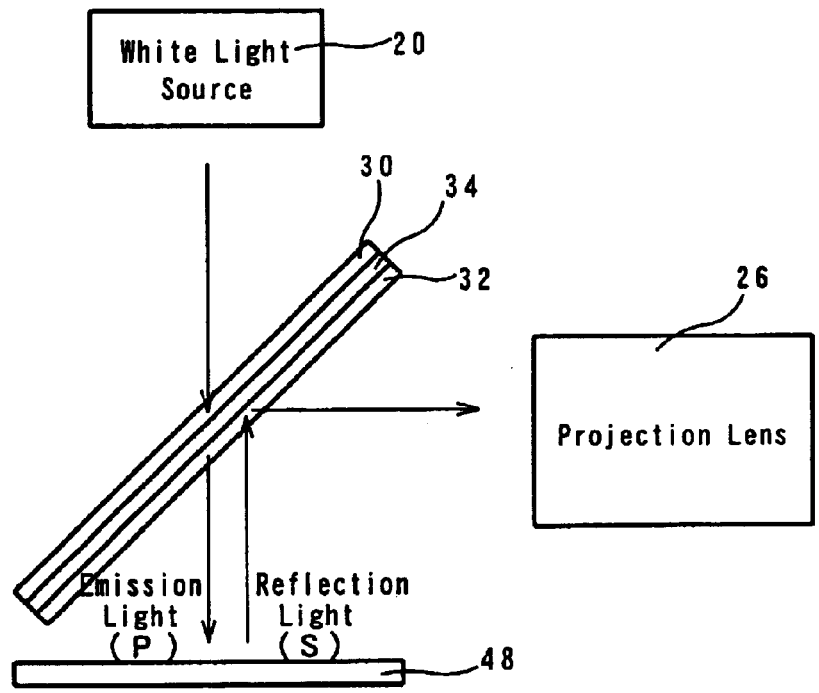
FIG. 14 shows the video projector as the second embodiment of the present invention, which corresponds to the diagram of a basic construction of the video projector using the polarized light color filter given in FIG. 3.

The embodiment shown in FIG. 13 has the video projector incorporating the optical modulating element as the rear projection liquid crystal panel 46, but the present invention is not limited to this embodiment and is also applicable to the video projector wherein the optical modulating element is used as the front screen liquid crystal panel 48 (an example of the reflection optical modulating element) as shown in FIG. 14.

In this case, when the white light, emitted from the white light source 20, is inputted to the polarized light color filter 34, the R-light, G-light and B-light (each being the P-polarized light) are selectively and sequentially outputted for each period (T/3), one third of the 1 period (T). The R-light, G-light and B-light emitted from the transmission side of the polarized light color filter 34 are modulated and reflected by the front screen liquid crystal panel 48, and the reflected lights (S-polarized lights) are reflected by the second wide-band polarization spectroscopic element 36(2) of the polarized light color filter 34 and projected on the screen (not shown) through the projection lens 26. In this case, the front screen liquid crystal panel 48 displays on the screen the colored image formed with the images by the R-light, G-light and B-light, which are synchronized with the R-light, G-light and B-light emitted from the polarized light color filter 34.

The embodiments shown in FIG. 13 and FIG. 14 are concerned with the video projector incorporating the filter composed of the polarized light color filter 34, having accumulative structures, securely interposed between the transparent substrates 30 and 32 respectively but the present invention is not limited to these embodiments and is also applicable to the video projector incorporating the filter composed of the polarized light color filter 34 having the accumulative structure which is securely interposed between the inclines of the triangular prisms 42 and 44 as is shown in FIG. 6 or applicable to the video projector incorporating the filter composed of the polarized light color filter 34 having an accumulative structure which is securely fixed to the inclined surface of the triangular a prism 42 as is shown in FIG. 7.

Figure 15:
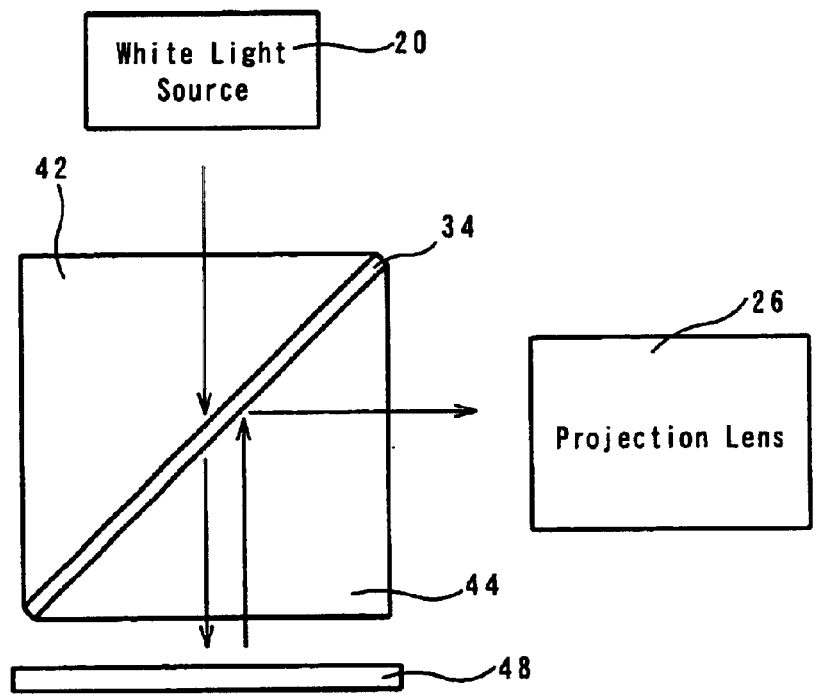
FIG. 15 is a diagram of a basic construction of the embodiment using the rectangular prisms 42 and 44 instead of the transparent substrates 30 and 32 given in FIG. 14.

For instance, the present invention is also applicable to the case where the white light source 20, the triangular prisms 42 and 44, the polarized light color filter 34, which is interposed securely between the triangular prisms 42 and 44, the front screen liquid crystal panel 48 and the projection lens 26 are arranged as shown in FIG. 15.

In this case, the angle of the light emitted from the white light source 20 is orthogonal to the Eeetanqu prism 42, and angle of the light emitted from the polarized light color filter 34 is orthogonal to the trianqular prism 44, while the angle of the light reflected by the front screen liquid crystal panel 48 is orthogonal to the triangular prism 44, whereby the distortion of the light caused by the refraction and reflection of the light occurring on the plane of incidence of the transparent substrates 30 and 32 can be eliminated to prevent the occurrence of the aberration.

Further, in the embodiment shown in FIG. 15, when the trianqular prism 42, having the polarized light color filter 34 securely fixed on its inclined surface as is shown in FIG. 7, is used instead of the triangular prisms 42 and 44 with the polarized light color filter 34 securely interposed between the inclines of the two Eeetangul a r prisms 42 and 44, the triangular prism 44 can be omitted.

In each of the embodiments shown in FIG. 13, FIG. 14 and FIG. 15, the polarized light color filter 34 is composed of the fourth polarized light converting element 38(4) and the second wide-band polarization spectroscopic element 36(2) in order to be made applicable to the video projector incorporating the front screen liquid crystal panel 48 provided on the emission side (transmission side) so that all the transmitted lights are made uniform to become the P-polarized lights by means of the fourth polarized light converting element 38(4), and the reflected light from the reflection optical modulating element is reflected by the second wide-band polarization spectroscopic element 36(2) for output to the projection lens, but the present invention is not limited to this embodiment and is also applicable to the case where the fourth polarized light converting element 38(4) and the second wide-band spectroscopic element 36, out of the elements constituting the polarized light color filter 34, are omitted and or the case where the second wide-band polarization spectroscopic element 36(2) is omitted.

Figure 5:
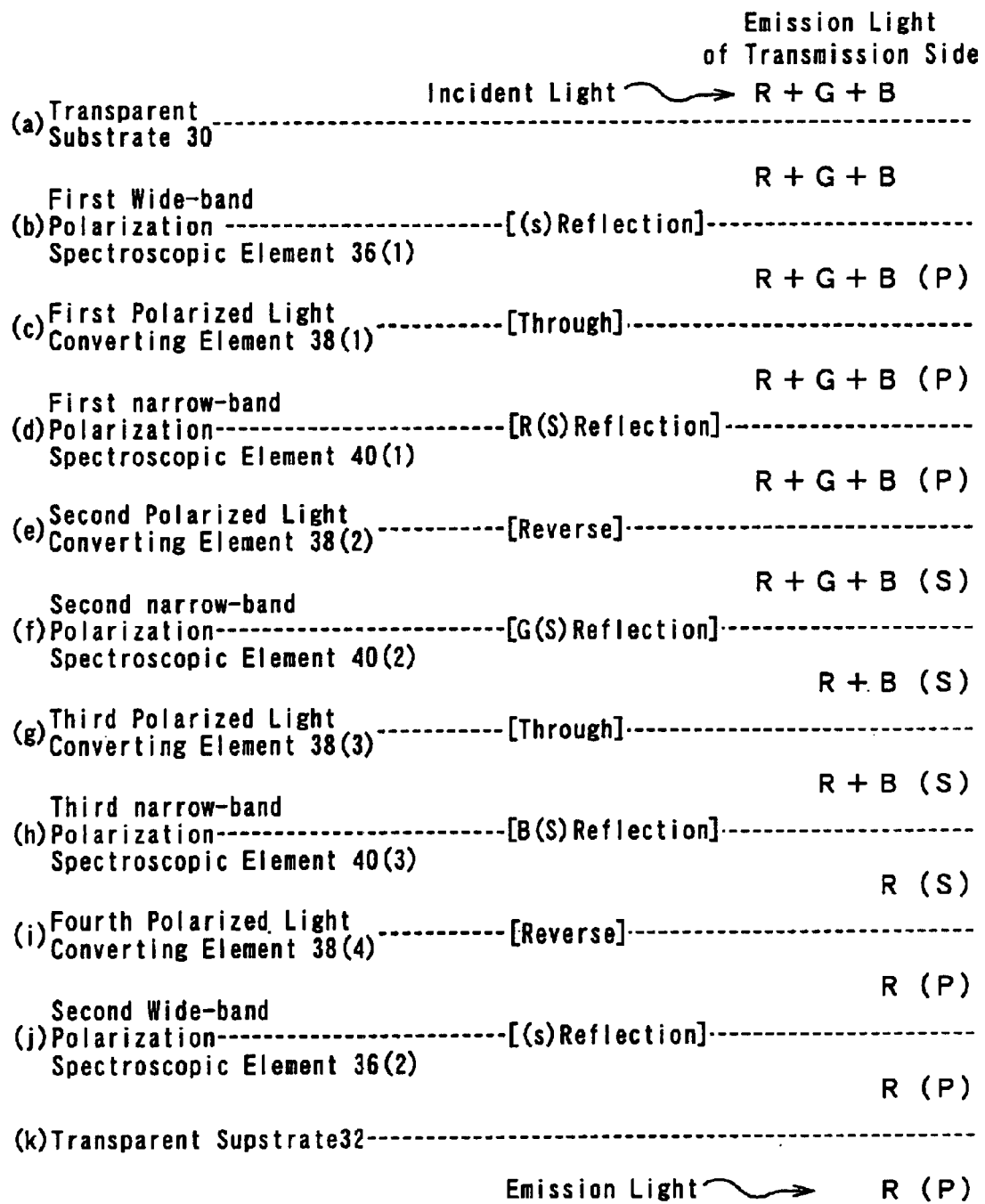
FIG. 5 is a diagram specifically illustrating the function of the polarized light color filter 34 given in FIG. 3.

For instance, as shown in FIG. 13, in the case of the video projector with the rear projection liquid crystal panel 46 provided on its light emission (transmission) side, when the fourth polarized light converting element 38(4) and the second wide-band polarization spectroscopic element 36(2) are omitted, the emitted light on the transmission side of the filter becomes equal to the emitted light (transmitted light) from the third narrow-band polarization spectroscopic element 40(3) shown in FIG. 5, and the direction of the polarization varies depending on the kind of the color, but the image to be formed by the rear projection liquid crystal panel 46 can be displayed by selectively displaying the non-reversed image or the reversed-image synchronized with the timing of the P-polarized light and the S-polarized light of the emitted light. To be specific, at the timing when the emitted lights are the R-light (S-polarized light) and the G-light (S-polarized light), the images by the R-light and the G-light to be produced by the transmission optical modulating element are produced as the reversed images, while the image by the B-light to be produced by the transmission optical modulating element is produced as a non-reverse image at the timing when the emitted light is the B-light (P-polarized light).

Further, in the case where only the second wide-band polarization spectroscopic element 36(2) is omitted, all the lights transmitted by the filter become P-polarized lights, so that it is not necessary to control the rear projection liquid crystal panel 46 for the reversal or non-reversal of the image to be produced.

The embodiment described above is concerned with the video projector incorporating the polarized light color filter 34 to be used when the incident light is the non-polarized light (the white light), but the present invention is not limited to this embodiment and is also applicable to the video projector incorporating the polarized light color filter 34a to be used when the incident light is the polarized P-polarized light or the S-polarized light.

FIG. 16 shows the video projector, an embodiment of the present invention, designed for operating in response to the incident light being the P-polarized light and comprising the polarized light color filter 34a, having the accumulative structure securely interposed between the glass substrates 30 and 32, and the optical modulating element composed of the rear projection liquid crystal panel 46.

In the case shown in FIG. 16, when the polarized P-polarized light falls at 45° on the polarized light color filter 34a through the glass substrate 30, the lights, as are shown in FIG. 9, will be emitted from both the reflection side and the transmission side of the polarized light color filter 34a respectively.

The reflected light is modulated by the rear projection liquid crystal panel 46 and projected on the screen through the projection lens 26. Therefore, when the rear projection type liquid crystal panel 46 displays the images of R-, G- and B-lights, which are synchronized with the R-light, G-light and B-light emitted from the polarized light color filter 34, the colored image will be displayed on the screen. In this case, the lights on the reflection side of the polarized light color filter 34a are identical P-polarized lights regardless of the color, so that it is not necessary to control the rear projection liquid crystal panel 46 for the selective setting for reversal or non-reversal display of the image.

The embodiment shown in FIG. 16 is concerned with the case where the rear projection liquid crystal panel 46 is provided on the reflection side of the polarized light color filter 34a, but the present invention is not limited to this embodiment and is also applicable to the case where the rear projection liquid crystal panel 46 is provided on the transmission side of the polarized light color filter 34a.

In this case, the direction of the polarization of the light emitted (transmitted) from the polarized light color filter 34a varies depending on the color of the light as shown in FIG. 9, so that it is necessary for the image to be produced by the rear projection liquid crystal panel 46 to be displayed selectively as the non-reversed image or the reversed image, according to the timings of the P-polarized light and the S-polarized light of the emitted light. For instance, when the timing of the emitted light is synchronized with the timing of the R-light (S-polarized light) and the timing of the G-light (S-polarized light), the images by the R-light and the G-light are formed as reversed images by the rear projection liquid crystal panel 46, while the image by the B-light to be produced by the rear projection liquid crystal panel 46 is a non-reverse image when the timing of the emitted light is synchronized with the timing of the B-light (P-polarized light).

The embodiment shown in FIG. 16 is concerned with the case where the optical modulating element is t a rear projection liquid crystal panel, but the present invention is not limited to this embodiment and is also applicable to the case where the optical modulating element is Tha front screen liquid crystal panel.

In this case, when the front screen liquid crystal panel is provided on the reflection side of the polarized light color filter 34a, the image to be formed by the rear projection liquid crystal panel is displayed as the non-reverse image, while when the front screen liquid crystal panel is provided on the transmission side of the polarized light color filter 34a, the image formed by the front screen liquid crystal panel is selectively displayed as the non-reverse image or the reverse image by being synchronized with the timings of the P-polarized light and the S-polarized light of the emitted light.

FIG. 17 shows the video projector, as an embodiment of the present invention, designed for using the S-polarized light as the incident light and comprising the polarized light color filter 34a having the accumulative structure securely interposed between the glass substrates 30 and 32, and the optical modulating element is the front screen liquid crystal panel 48.

In the case shown in FIG. 17, when the polarized S-polarized light falls at 45° on the polarized light color filter 34a through the glass substrate 30, the light will be outputted from both the reflection side and the transmission side the polarized light color filter 34a as shown in FIG. 10.

The light emitted from the reflection side is modulated by the front screen liquid crystal panel 48 and reflected, and the reflected light passes through the polarized light color filter 34a and projected on the screen through the projection lens 26. Therefore, when the front screen liquid crystal panel 48 displays the images by the R-, G- and B-lights, which are synchronized with the R-light, G-light and B-light emitted from the polarized light color filter 34a, the colored image will be displayed on the screen. In this case, all the lights emitted from the reflection side of the polarized light color filter 34a are uniform (S-polarized light) with respect to all the colors, so that it is not necessary to selectively display the reverse image or the non-reverse image by the R-light, G-light and B-light at the stage of the front projection liquid crystal panel 48.

The embodiment shown in FIG. 17 is concerned with the video projector designed for operating by using S-polarized light as the incident light and comprising the optical modulating element being the front projection liquid crystal display 48, but the present invention is not limited to this embodiment and is also applicable to the video projector designed for operating by using S-polarized light as the incident light and comprising the optical modulating element being the rear projection liquid crystal panel 46.

In this case, the light is emitted from both the reflection side and the transmission side of the polarized light color filter 34a, so that when the rear projection liquid crystal panel 46 is provided on the transmission side of the polarized light color filter 34a, the direction of the polarization of the light emitted (transmitted) from the polarized light color filter 34a varies depending on the color of the light as shown in FIG. 10, and so it is sufficient to selectively display the non-transverse image and the transverse image by being synchronized with the timings of the P-polarized light and the S-polarized light of the emitted light in producing the image by the rear projection liquid crystal panel 46.

Further, in the case where the rear projection liquid crystal panel 46 is provided on the reflection side of the polarized light color filter 34a, all the lights emitted (reflection) from the polarized light color filter 34a are uniform (S-polarized light) with respect to all the colors, so that it is not necessary to select the reverse image or non-reverse image with respect to the images of R-light, G-light and B-light to be displayed by the rear projection liquid crystal panel 46.

The embodiments shown in FIG. 16 and FIG. 17 are concerned with the video projector using the polarized light color filter 34 having the accumulative structure securely interposed between the transparent substrates 30 and 32, but the present invention is not limited to this embodiment and is also applicable to the video projector using the polarized light color filter 34a having the accumulative structure securely interposed between the inclines of the triangular prisms 42 and 44 as shown in FIG. 11 or to the video projector using the polarized light color filter 34a having the accumulative structure fixed securely on the incline of the triangular prism 42 as shown in FIG. 12.

In the case described above, not only the occurrence of the aberration can be prevented but also the triangular prism 44 can be omitted in the case where the polarized light color filter as is used as in FIG. 12.

Figure 18:
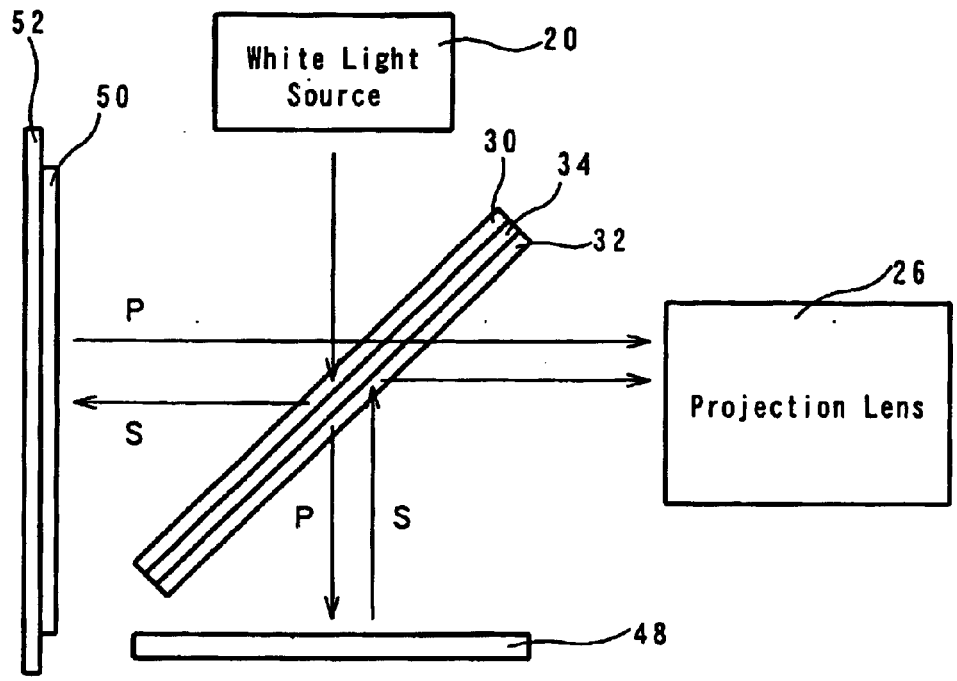
FIG. 18 shows the video projector as the fifth embodiment of the present invention, which corresponds to the diagram showing a basic construction of the video projector using the polarized light color filter 34 given in FIG. 3.
Figure 19:
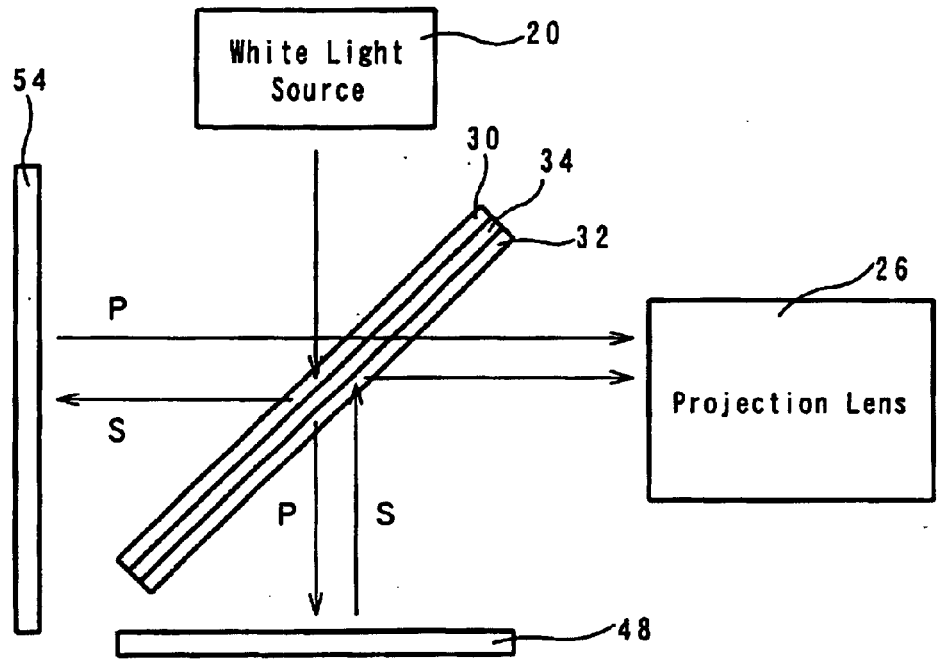
FIG. 19 shows the video projector as the sixth embodiment of the present invention, which corresponds to the diagram of a basic construction of the video projector using the polarized color filter 34 given in FIG. 3.

The embodiments shown in FIG. 13 through FIG. 17 are concerned with the video projectors using either the transmitted light or the reflected light from the polarized light color filter, but the present invention is not limited to these embodiments and is applicable to the video projectors using both the transmitted light and the reflected light of the polarized light color filter as are shown in FIG. 18 and FIG. 19.

FIG. 18 shows an embodiment wherein front screen liquid crystal panel 48 is provided on the transmission side of the polarized light color filter 34, while the ¼ retardation film (an example of ¼ wave plate) 50 and the total reflection mirror 52 are provided on the reflection side; when the white light, emitted from the white light source 20, falls at 45° on the polarized light color filter 34 through the transparent substrate 30, the light will be emitted from both the transmission side and the reflection side of the polarized light color filter 34.

The light emitted (P-polarized light) from the transmission side of the polarized color filter 34 is modulated by the front screen liquid crystal panel 48, and the reflected light (S-polarized light) is reflected by the polarized light color filter 34 to be projected on the screen through the projection lens 26 to display the colored image on the screen.

The light emitted (S-polarized light) from the reflection side of the polarized light color filter 34 passes through the 1/4 retardation film to be reflected by the total reflection mirror 52; the reflected light again passes through the 1/4 retardation film 50 to become the P-polarized light, whereby the P-polarized light is projected on the screen through the projection lens 26. The projected light brightens the whole screen, so that the picture can be seen easily even in a bright room. More specifically, since, in this embodiment, the projected light brightens the whole screen, the brightness, which tends to be perceived as a dark color in contrast with the lighting of the room, can be made to be seen more clearly even in a brightly illuminated room.

FIG. 19 shows an embodiment wherein the front screen liquid crystal panel 48 is provided on the transmission side of the polarized light color filter 34, while the front screen liquid crystal panel 54 is provided on the reflection side of the same filter; when the white light, emitted from the white light source 20, falls at 45° on the polarized light color filter 34 through the transparent substrate 30, the light will be emitted from both the transmission side and the reflection side of the polarized light color filter 34.

The light emitted (P-polarized light) from the transmission side of the polarized light color filter 34 is modulated by the front screen liquid crystal panel 48, and the reflected light (S-polarized light) is reflected by the polarized light color filter 34 and is projected on the screen through the projection lens 26 to display the colored image on the screen.

The light emitted (S-polarized light) from the reflection side of the polarized light color filter 34 is modulated by the front screen liquid crystal panel 54, and the reflected light (P-polarized light) passes through the polarized light color filter 34 to be projected on the screen through the projection lens 26. The light to be projected can be controlled by the voltage applied to the front screen liquid crystal panel 54, so that high-contrast and high-luminance images can be displayed selectively on the screen by controlling the voltage applied to the front screen liquid crystal panel 54, if necessary.

For instance, the high-contrast image can be displayed on the screen by the method, in which the construction of the front screen liquid crystal panel 54 is made similar to that of the front screen liquid crystal panel 48; the front screen liquid crystal panel 48 is modulated by the color video signal; the front screen liquid crystal panel 54 is modulated by the color video signal whose polarity is reversed.

Further, the high-contrast and high-luminance image whose optical density is controlled to the predetermined level can be displayed on the screen by the method, in which the construction of the front screen liquid crystal panel 54 is made similar to that of the front screen liquid crystal panel 48; the front screen liquid crystal panel 48 is modulated by the color video signal; the polarity of the luminance signal generated by the color video signal is reversed; and the front screen liquid crystal panel 54 is modulated by a properly weighted signal.

The embodiments shown in FIG. 18 and FIG. 19 are concerned with a video projector using a filter composed of the polarized light color filter 34 having an accumulative structure securely interposed between the transparent substrates 30 and 32, but the present invention is not limited to these embodiments and is also applicable to the video projector using the polarized light color filter 34 having an accumulative structure securely interposed between the inclines of the triangular prisms 42 and 44 as is shown in FIG. 6, as well as to the video projector using the polarized light color filter 34 having an accumulative structure securely fixed on the incline of the triangular prism 42 as shown in FIG. 7.

In these embodiments, not only the occurrence of the aberration can be prevented but also, in the case of the embodiment using the polarized light color filter 34 shown in FIG. 7, the triangular prism 44 can be omitted.

In embodiments described in the foregoing, the first primary light is R-light; the second primary light is G-light; the third primary light is B-light, but the present invention is not limited these embodiments.

For instance, the present invention is also applicable to the case where the first primary light is G-light; the second primary light is B-light; the third primary light is R-light.

Industrial Applicability

As discussed in the foregoing, with the polarized light color filter according to the present invention, the light to be emitted from the polarized light color filter can be any color (e.g., white, yellow, red, black, magenta, cyan, blue and green) which can be made available by combining the three primary colors in any way by controlling the voltages applied to the first, second and third polarized light converting elements, thereby enabling the mechanical element to be omitted. Therefor, the present invention, when applied to a video projector using the polarized light color filter, can contribute to the reduction of the dimensions, improvement in mechanical strength against the mechanical vibration, realization of the free variation of the distribution of r-light, g-light and b-light during a given period and speeding of switching among these lights and the improvement in the utilization rate per light quantity of the light source.

What is claimed is:

1. A polarized light color filter having an incident light side and an emitted light side and comprising, in order and at an angle to the incident light optical path, a first polarized light converting element provided adjacent the incident light side for selectively emitting polarized incident light thereon after either changing the polarity of the polarized incident light or leaving the polarity of the incident light unchanged according to a voltage applied to the first polarized light converting element, a first polarization spectroscopic element comprising a first narrow band polarization spectroscopic element for reflecting only the S-polarized light component out of a first primary light corresponding to a first primary color, a second polarized light converting element for selectively emitting polarized incident light thereon after either changing the polarity of the polarized incident light or leaving the polarity of the incident light unchanged according to a voltage applied to the second polarized light converting element, a second polarization spectroscopic element comprising a second narrow band polarization spectroscopic element for reflecting only the S-polarized light component out of a second primary light corresponding to a second primary color, a third polarized light converting element for selectively emitting polarized incident light thereon after either changing the polarity of the polarized incident light or leaving the polarity of the incident light changed according to a voltage applied to the third polarized light converting element, a third polarization spectropscopic element comprising a third narrow band polarization spectroscopic element for reflecting only the S-polarized light component out of a third primary light corresponding to a third primary color and control means for applying a voltage on a time-divisional basis to the first, second and third polarized light converting elements.

2. The polarized light color filter according to claim 1, wherein a first wide-band polarization spectroscopic element, for reflecting the S-polarized light component of the incident light over the whole range of the visible light while transmitting the P-polarized light component, is provided on an incident light side of the first polarized light converting element.

3. The polarized light color filter according to claim 2, wherein the first, second and third polarized light converting elements, the first, second and third narrow-band polarization spectroscopic elements and the first wide-band polarization spectroscopic element formed on a transparent substrate.

4. The polarized light color filter according to claim 2, wherein the first, second and third polarized light converting elements, the first, second and third narrow-band polarization spectroscopic elements and the first wide-band polarization spectroscopic element are interposed between inclined surfaces of two triangular prisms which form a rectangular parallelepiped when joined by their inclined surfaces.

5. The polarized light color filter according to claim 2, wherein the first, second and third polarized light converting elements, the first, second and third narrow-band polarization spectroscopic elements and the first wide-band polarization spectroscopic element are provided on an inclined surface of a triangular prism.

6. The polarized light color filter according to claim 1, wherein first wide-band polarization spectroscopic element, for reflecting the S-polarized component of the incident light over the whole range of visible light while transmitting the P-polarized light component, is provided on an incident light side of the first polarized light converting element and a fourth polarized light converting element for selectively emitting polarized incident light thereon after either changing the polarity of the polarized incident light or leaving the polarity of the polarized incident light unchanged according to a voltage applied thereteto the fourth polarized light converting element, is provided on an emission side of the third polarization spectroscopic element.

7. The polarized light color filter according to claim 6, wherein the first, second, third and fourth polarized light converting elements, the first, second and third narrow-band polarization spectroscopic elements, and the first wide-band polarization spectroscopic element are formed on a transparent substrate.

8. The polarized light color filter according to claim 6, wherein the first, second, third and fourth polarized light converting elements, the first, second and third narrow-band polarization spectroscopic elements, and the first wide-band polarization spectroscopic elements are provided between inclined surfaces of two triangular prisms which form a rectangular parallelepiped when joined by their inclined surfaces.

9. The polarized light color filter according to claim 6, wherein the first, second, third and fourth polarized light converting elements, the first, second and third narrow-band polarization spectroscopic elements, and the first wide-band polarization spectroscopic element are provided on an inclined surface of a triangular prism.

10. The polarized light color filter according to claim 1, comprising a first wide-band polarization spectroscopic element, for reflecting the S-polarized light component of the incident light over the whole range of visible light while transmitting the P-polarized light component, is provided on an incident light side of the first polarized light converting element, and a fourth polarized light converting element, for selectively emitting polarized incident light thereon after either changing the polarity of the polarized incident light or leaving the polarity of the polarized incident light unchanged according to a voltage applied to the fourth polarized light converting element and a second wide-band polarization spectroscopic element for reflecting the S-polarized light component of the incident light while transmitting the P-polarized light component over the whole range of visible light, are provided on an emission side of the third polarized light converting element.

11. The polarized light color filter according to claim 10, wherein the first, second, third and fourth polarized light converting elements, the first, second and third narrow-band spectroscopic elements, and the first and second wide-band polarization spectroscopic elements are formed on a transparent substrate.

12. A video projector comprising the polarized light color filter according to claim 11, wherein ehea reflection optical modulating element is provided on an emission side of said polarized light color filter, a projection lens is provided on a non-emission side, and the voltages applied to the first, second, third and fourth polarized light converting elements are controlled so that the three primary lights are emitted to said reflection optical modulating element from said polarized light color filter and controlled on the time-division basis.

13. The video projector according to claim 12, wherein a ¼ wave plate and a total reflection mirror are sequentially provided on another emission side of the polarized light color filter.

14. The video projector according to claim 12, wherein a second reflection optical modulating element, having an identical structure with that of said reflection optical modulating element, is provided on another emission side of said polarized light color filter.

15. A video projector comprising the polarized light color filter according to claim 11, wherein a sequential transmission optical modulating element and a projection lens are provided on an emission side of said polarized light color filter and the voltages applied to the first, second, third and fourth polarized light converting elements are controlled so that the three primary lights are emitted to said transmission optical modulating element and controlled on the time-division basis.

16. The polarized light color filter according to claim 10, wherein the first, second, third and fourth polarized light converting elements, the first, second and third narrow-band polarization spectroscopic elements, and the first and second wide-band polarization spectroscopic elements are interposed between inclined surfaces of two triangular prisms which form a rectangular parallelepiped when joined by their inclined surfaces.

17. The polarized light color filter according to claim 10, wherein the first, second, third and fourth polarized light converting elements, the first, second and third narrow-band polarization spectroscopic elements, and the first and second wide-band polarization spectroscopic elements are formed on an inclined surface of a triangular prism.

18. The polarized light color filter according to claim 1, wherein the first, second and third polarized light converting elements and the first, second and third narrow-band polarization spectroscopic elements are formed on a transparent substrate.

19. A video projectors comprising the polarized color filter according to claim 18, wherein a reflection optical modulating element is provided on an emission side of said polarized light color filter; a projection lens is provided on a non-emission side of said polarized light color filter; the three primary lights are emitted to said reflection optical modulating element from said polarized light color filter and controlled on the time-division basis by controlling the voltages applied to the first, second and third polarized light converting elements.

20. A video projectors comprising the polarized light color filter according to claim 18, wherein a sequential transmission optical modulating element and a projection lens are provided on an emission side of said polarized light color filter, and the voltages applied to the first, second and third polarized light converting elements are controlled so that the three primary lights are emitted to said sequential transmission optical modulating element from said polarized light color filter and controlled on the time-division basis.

21. The polarized light color filter according to claim 1, wherein the first, second and third polarized light converting elements and the first, second and third narrow-band polarization spectroscopic elements are interposed between inclined surfaces of two of triangular prisms which form a rectangular parallelepiped when joined by their respective inclined surfaces.

22. The polarized light color filter according to claim 1, wherein the first, second and third polarized light converting elements and the first, second and third narrow-band polarization spectroscopic elements provided on an inclined surface of a triangular prism.

* * * * *